(12) United States Patent
Pick

(10) Patent No.: US 7,104,373 B2
(45) Date of Patent: Sep. 12, 2006

(54) ELECTRO-PNEUMATIC SHIFTING SYSTEM

(76) Inventor: Dean Pick, 305-2180 W. 6th Ave., Vancouver (CA) V6K 1V6

( * ) Notice: Subject to any disclaimer, the term of this patent is extended or adjusted under 35 U.S.C. 154(b) by 106 days.

(21) Appl. No.: 10/924,805

(22) Filed: Aug. 25, 2004

(65) Prior Publication Data

US 2005/0044975 A1    Mar. 3, 2005

Related U.S. Application Data

(60) Provisional application No. 60/497,331, filed on Aug. 25, 2003.

(51) Int. Cl.
  *B60W 10/02* (2006.01)
  *B60W 10/10* (2006.01)
  *F16D 25/12* (2006.01)
(52) U.S. Cl. .................. 192/3.51; 192/83; 192/85 C; 192/109 F
(58) Field of Classification Search ............ 192/83
  See application file for complete search history.

(56) References Cited

U.S. PATENT DOCUMENTS 4,560,049 A * 12/1985 Uchibaba et al. ......... 192/85 R
5,033,598 A   7/1991  Tipton
5,360,381 A   11/1994 Swist
6,102,183 A   8/2000  Gerken
6,227,342 B1  5/2001  Armbruster
6,348,023 B1* 2/2002  Martelli ................ 477/107
6,409,005 B1* 6/2002  Heston .................. 192/85 C
2002/0104731 A1 8/2002 Dockery
2004/0055849 A1 3/2004 Doremus

FOREIGN PATENT DOCUMENTS

GB       2233408       1/1991

* cited by examiner

*Primary Examiner*—Richard M. Lorence
(74) *Attorney, Agent, or Firm*—Deeth Williams Wall LLP; Douglas N. Deeth

(57) ABSTRACT

An electro-pneumatic control system for a motorcycle transmission. A pneumatic clutch cylinder used to disengage the clutch by pulling in a clutch lever via a clutch cylinder rod. Optionally, manual override of the clutch control may be provided for by linking the clutch lever to a clutch cable by a through rod and slip device. To change gear a pneumatic gear change cylinder, attached to the gear change lever, push-pulls lever to upshift and downshift transmission. The system is equipped with launch control that allows the motorcycle to start from a standstill.

37 Claims, 4 Drawing Sheets

ELECTRO-PNEUMATIC SHIFTING SYSTEM

FIELD OF THE INVENTION

The present invention relates to a system for controlling a motorcycle transmission, more specifically to an electro-pneumatic control system for a motorcycle transmission.

BACKGROUND OF THE INVENTION

The characteristics of speed, torque (turning or twisting force), and power (rate or speed at which work is performed) for a typical internal combustion engine in a motor vehicle such as a motorcycle or a car usually do not match the requirements of the final propulsion component. For example, the range of output of the engine in a motorcycle does not match the range of requirements of the wheels in contact with the road surface. A clutch, disengageably connecting the engine to the transmission, provides the means to apply and remove engine torque to the transmission's input drive shaft.

A typical clutch assembly for a motorcycle includes a clutch lever located at or near the handlebar, and a clutch disengagement mechanism connected to the clutch lever by a clutch cable. The clutch is disengaged by activating the clutch lever which requires pulling of the clutch cable on its end. This simple standard approach has a number of disadvantages, including the cable becoming broken or extended over time, and the physical effort required to disengage the clutch lever. As a result, the clutch may not be fully disengaged unless the driver put in significant effort, which in itself may be distracting and lead to loss of control. The cable may also be trapped and rendered stuck against mechanical feature of the entire assembly.

GB2,233,408 refers to an electro-pneumatic gear-change system with emergency back up pressure source for a variable-speed gearbox, in which the gear selections are made pneumatically via actuating cylinders which are controlled by solenoid valves.

U.S. Pat. No. 5,033,598 discloses a combined mechanical and fluid pressure actuated slider clutch for a motorcycle including fluid power source supplying pressurized fluid for energizing pressure actuated controls wherein the fluid power source is pneumatic pressure.

U.S. Pat. No. 5,360,381 relate to a programmed automatic control for motorcycle and motor vehicle mechanical clutches activated by pneumatic source means wherein the power source is a motorcycle engine.

US patent application 20040055849 refers to a clutch, in particular for motor vehicle, with pneumatic control applicable to industrial vehicles equipped with a pressurized gas source. The application discloses a pneumatic actuator to control the disengaging of a clutch.

From US patent application 20020104731 is known a pneumatic powered clutch linkage entailing a conventional mechanical clutch to be powered or actuated through a powered fluid or pneumatic cylinder and thereby relieving the operator of the requirement of continuously and repeatedly actuating the clutch through a foot operated clutch pedal.

One approach, as seen in U.S. Pat. Nos. 6,102,183 and 6,227,342 both relating to motorcycle clutch systems, is to use hydraulic activation of the clutch disengagement mechanism. Hydraulic activation has the disadvantage of a fairly slow disengagement rate. A high disengagement rate is particularly crucial in certain cases, e.g. motorcycle racing.

There is a need to provide a way of activating the clutch disengagement mechanism such as to remove or minimize the disadvantages mentioned above.

SUMMARY OF THE INVENTION

The invention relates to an electro-pneumatic control system for a motorcycle transmission, comprising a pneumatic clutch cylinder used to disengage a clutch by pulling in a clutch lever via a clutch cylinder rod, valve means being provided to control said clutch cylinder by regulating a pressure medium flow from a pressure medium source. As per the invention said clutch cylinder is a single acting pneumatic clutch cylinder and cited valve means comprise a 3/2 way clutch valve controlled by an electrically operated clutch valve switch to allow said pressure medium to be introduced from said pressure medium source into one end of the clutch cylinder. The proposed shifting system makes use additionally of a 3/2 way launch control valve controlled by an electrically operated launch control valve switch to direct exhausting pressure medium from the clutch cylinder through a restrictor in order to slow down the rate of clutch engagement on startup.

According to an alternative embodiment said clutch cylinder has a through rod connected at one end to said clutch lever by a rod and at the other end to a manually operated clutch cable via a slip device.

An end piece of said clutch cable (retaining it affixed) slides into said slip device during pneumatically operated (controlled) clutching without applying any force to said clutch lever and said end piece of said clutch cable pulls on said slip device that pulls in turn on said through rod and said clutch lever during manual clutching to provide manual override.

Other features of the invention will be evident from the disclosure of several embodiments that follows.

BRIEF DESCRIPTION OF THE DRAWINGS

Embodiments of the invention will be described by way of example and with reference to the drawings in which.

DETAILED DESCRIPTION OF THE INVENTION

Figure 1A:
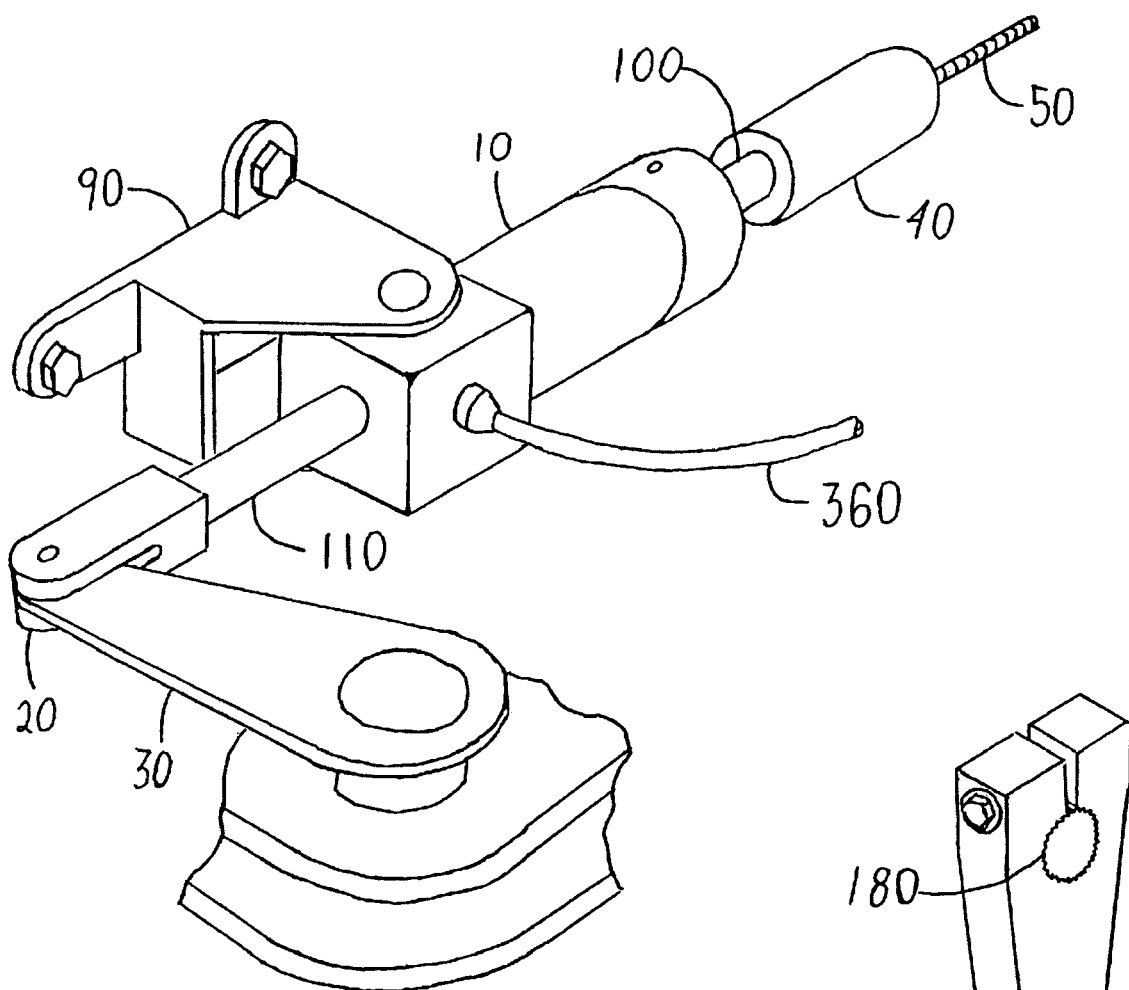
FIG. 1A is an external view of a clutch control arrangement including a clutch cylinder according to the invention.
Figure 1B:
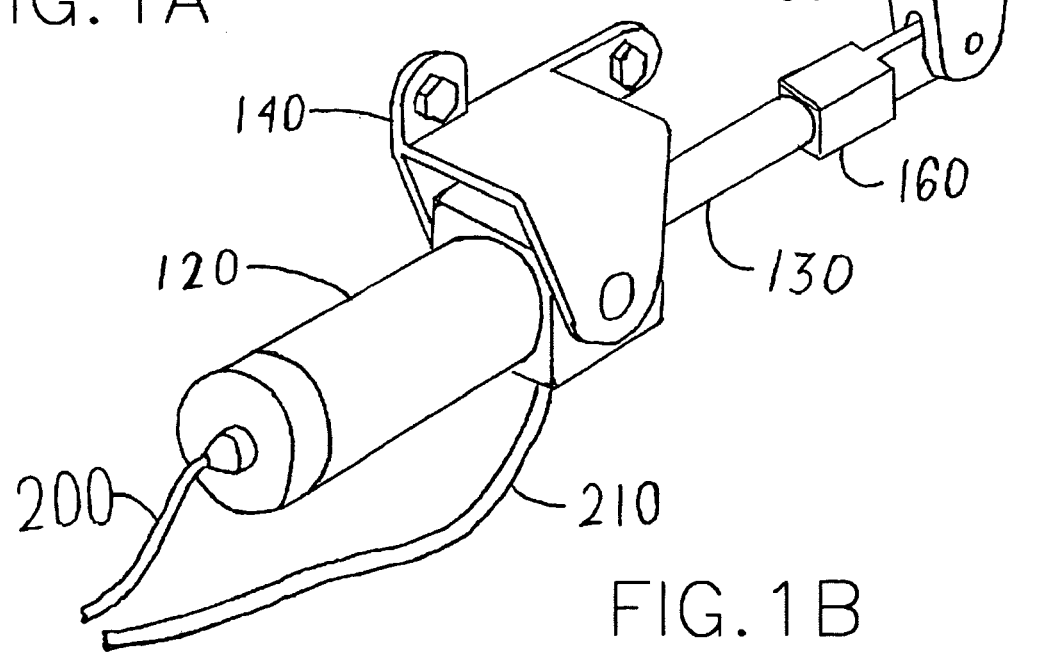
FIG. 1B is an external view of a gear shifting arrangement including a gear cylinder according to the invention.
Figure 2:
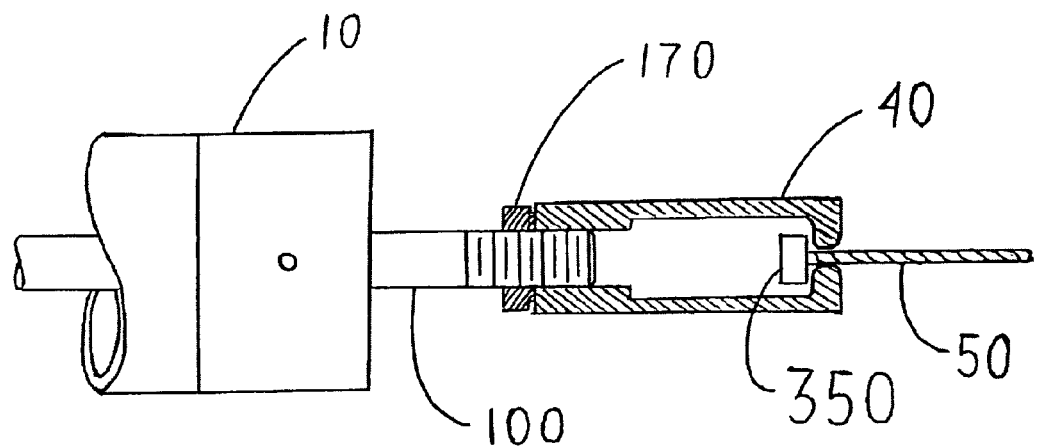
FIG. 2 is a cross-sectional view of the slip device of the embodiment of FIG. 1 showing the clutch cable and clutch cylinder.
Figure 3:
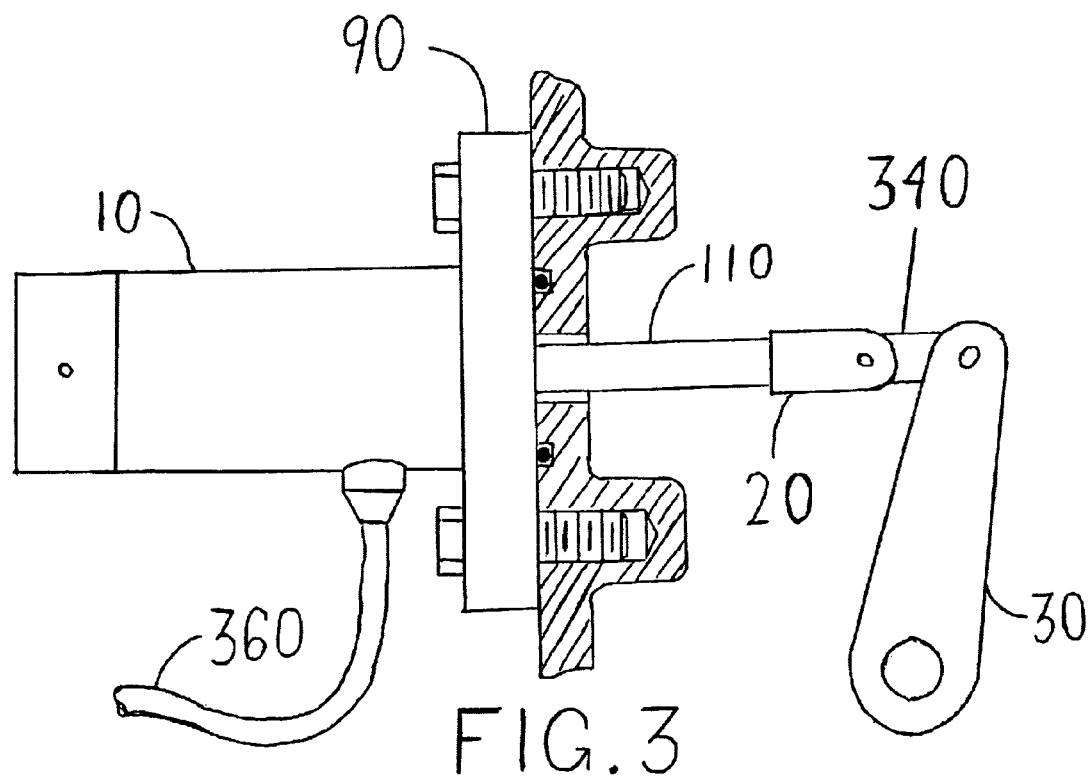
FIG. 3 shows an alternate clutch cylinder mounting element and the clutch cylinder as connected to the clutch lever.

FIGS. 1A and 1B are external views of a clutch control arrangement and a gear shifting arrangement, respectively, according to one embodiment of the invention. FIGS. 2 and 3 add further detail. The basic mechanism involves a single acting pneumatic clutch cylinder 10, standard or having a through rod 100, used to disengage the clutch by pulling in a clutch lever 30 via a clutch cylinder rod 110. The clutch cylinder rod 110 is typically connected to the clutch lever 30 by a link piece 20.

The control system can have independent and total control of the clutch; as an option, manual override may be provided for, as indicated in FIG. 1, by linking the clutch lever 30 to a clutch cable 50 by a through rod 100. During manual clutching, the clutch cable 50 and clutch cable end piece 350 pulls on a slip device 40 that pulls the through rod 100 and the clutch lever 30. On the other hand, during controlled clutching, the clutch cable 50 slides into the slip device 40 and does not apply any force to the clutch lever 30 directly or indirectly.

The clutch cylinder 10 is fixed by a clutch cylinder mounting element 90. An optional pivot allows the entire cylinder assembly to pivot along an axis parallel to that defined by the clutch lever 30. In a variation, the clutch cylinder 10 is affixed, directly or otherwise, to the side of the engine block. An intermediate link 340 between the clutch lever 30 and link piece 20 may be used to prevent bending moments on assembly.

Figure 4:
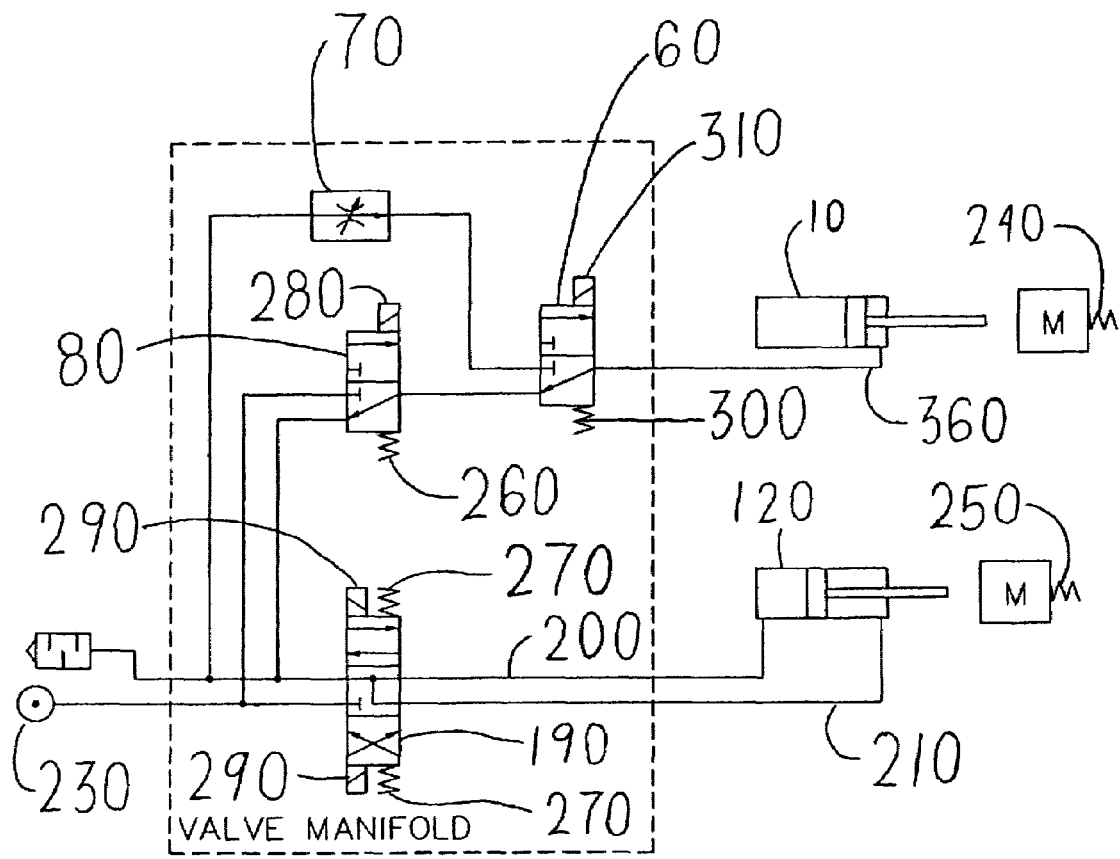
FIG. 4 is a pneumatic diagram of the preferred embodiment of FIG. 1.

FIG. 4 is a pneumatic circuit of a preferred embodiment of the present invention, which includes the clutch control system and a gear control system. The former includes a clutch lever 30, clutch cylinder rod 110, clutch cylinder 10. In addition, a gear cylinder 120 is shown for push-pulling the gear lever 150 by a gear cylinder rod 130. The gear cylinder 120 is preferably installed with the cylinder half-extended, and is mounted by a gear cylinder mounting element 140. A pivot link 160 connects the gear cylinder rod 130 and the gear lever 150. A gear pinion 180 usually protrudes from the transmission case, and connects to the gear selection drum.

Both cylinders 10 120 must have enough travel to fully actuate the corresponding lever 30 150. Each lever 30 150 preferably has a biasing means 240 250 as indicated in FIG. 4. One possible type of a biasing means is a spring return. Additionally, the clutch piston 10 hard stops can position the clutch lever 30 on clutch disengagement.

Control of the clutch cylinder 10 is accomplished by way of a clutch valve 80. The clutch valve 80 is typically a 3/2 way valve (3 ports and 2 positions). Valve position is controlled by a clutch valve switch 280 (typically a solenoid). The clutch valve 80 has a valve biasing means 260 such that the default position will have the clutch cylinder 10 exhausting to the surrounding environment. This has the effect of conserving power as the shifts are initiated periodically. If the clutch valve switch 280 is engaged, a high pressure pressure medium is introduced from a pressure medium source 230 into one end of the clutch cylinder 10, which urges the clutch cylinder rod 110 against the clutch lever 30. A possible pressure medium is carbon dioxide ($CO_2$) gas; and the pressure medium source 230 is a $CO_2$ tank. and regulator. In an alternative embodiment said pressure medium is air, and the pressure medium source (230) is an air compressor and tank (compact and light embodiments available in the market can suitably fit in a motorcycle).

Control of the gear cylinder 120 takes place by a gear valve 190, which is typically a 4/3 way valve. As in the case of the clutch valve 80, valve position is controlled by a gear valve switch 290 (typically also a solenoid). The gear valve 190 has a valve biasing means 270 such that the default position will have the gear cylinder 120 exhausting to the surrounding environment. This has the effect of conserving power as the shifts are initiated periodically. If the gear valve switch 290 is engaged, a high pressure medium is introduced from a pressure medium source 230. Gear upshift pressure line 200 allows the pressure medium to flow into one half of the gear cylinder 120 on upshift, while gear downshift pressure line 210 allows the pressure medium to flow out of the other half of the gear cylinder 120 and exhaust to surrounding environment. Similarly, gear downshift pressure line 210 allows the pressure medium to flow into the latter half of the gear cylinder 120 on downshift, while gear upshift pressure line 200 allows the pressure medium to flow out of the first half of the gear cylinder 120 and exhaust to surrounding environment.

Due to the biasing means 240 250 for the levers 30 150, this will result in the cylinders 10 120 returning to their home positions when the pressure medium is exhausted. Both valves 80 190 have valve biasing means 260 270 such that the default position will have the corresponding cylinders 10 120 exhausting to the surrounding environment. This has the effect of conserving power as the shifts are initiated periodically. Pneumatic exhaust components should be used to keep contaminants out of the system. Optionally a valve manifold (as one possible preferred embodiment is shown in FIG. 4) may be included to bundle the pneumatic control elements.

When starting the vehicle from standstill, special control of the clutch is required. The engine will stall if the clutch is engaged too quickly due to the high torque requirement. To slow down the clutch return on start-up, an additional 3/2 way valve (the launch control valve 60) may be used to direct exhaust pressure medium through a restrictor 70. The restrictor 70 can be fixed or adjustable and controls the flow of gas through it. By adjusting the restrictor 70, the clutch return rate may be controlled. As in the case of the previously discussed valves 80 190, the launch control valve 60 has a launch control valve biasing means 300 and a launch control valve switch 310 (typically also a solenoid). In the default position, the launch control valve biasing means 300 forces the launch control valve 60 to allow the pressure medium to flow to the clutch cylinder 10; when the launch control valve switch 310 is engaged, the launch control valve 60 is shifted into the position connecting the restrictor 70 with the clutch cylinder 10 but stopping the pressure medium. The launch control valve 60 is located closest to the clutch cylinder 10 so as to minimize the pressure drop in the clutch pressure line 360 at the beginning of a launch. Another embodiment of the invention would have the launch control valve 60 connected to the exhaust port of the clutch valve 80 so as to minimize the volume between the clutch cylinder 10 and the clutch valve 80 resulting in the clutch pressure line 360 becoming pressurized quickly.

A digital controller may be used, reading in data from sensor inputs such as switches and position sensors, and writing data to actuators such as relays and solenoids. An analog circuit may be used to support the digital controller.

Figure 5:
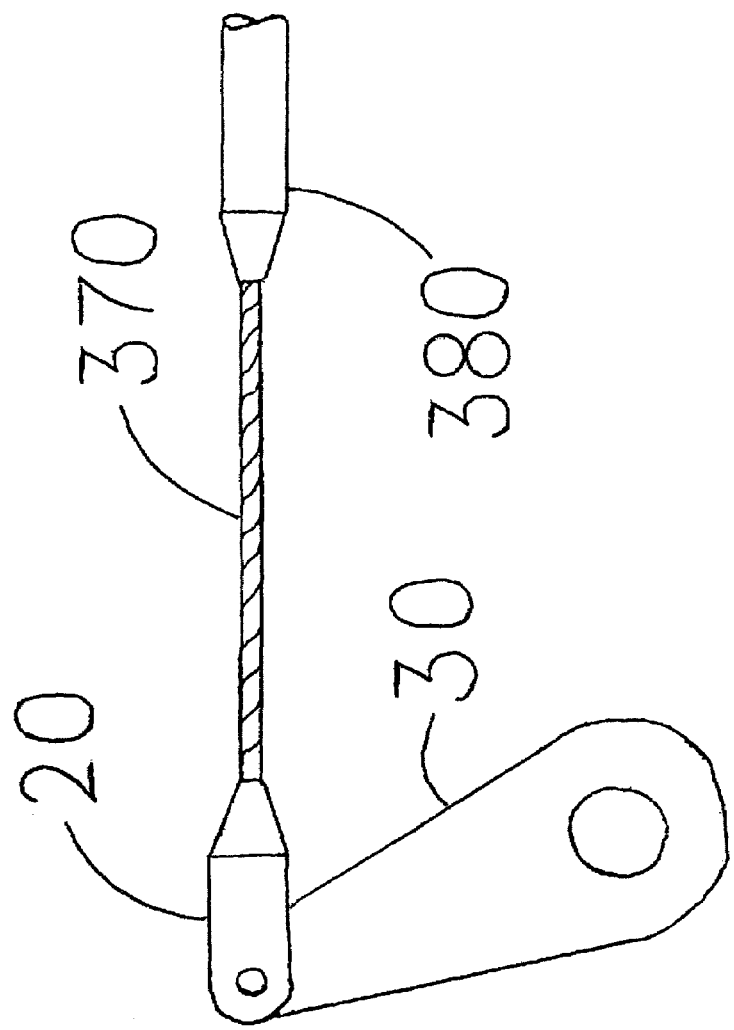
FIG. 5 is a prior art figure showing an alternative known lever configuration.

FIG. 5 shows a known alternative configuration of clutch lever (30) connected to another device (380), which in the current invention would be the clutch cylinder (110). The linking piece (20) of the clutch lever (30) is attached to one end of a cable (370) and the other end of the cable (370) is attached to a device (380) which is to be operated by pulling the clutch lever. Since the clutch lever only provides an operative force in one direction, the cable (370) is a suitable connector.

It will be appreciated that the above description relates to the preferred embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. An electro-pneumatic control system for a motorcycle transmission, comprising a pneumatic clutch cylinder (10) used to disengage a clutch by pulling in a clutch lever (30) via a clutch cylinder rod (110), valve means being provided to control said clutch cylinder (10) by regulating a pressure medium flow from a pressure medium source (230), wherein said clutch cylinder (10) is a single acting pneumatic clutch cylinder (10) and said valve means comprise a clutch valve (80) controlled by an electrically operated clutch valve switch (280) to allow said pressure medium to be introduced from said pressure medium source (230) into one end of the clutch cylinder (10), and a launch control valve (60) controlled by an electrically operated launch control valve switch (310) to direct exhaust pressure medium from the clutch cylinder (10) through a restrictor (70) in order to slow down a rate of clutch engagement on start-up.

2. The electro-pneumatic control system as per claim 1, wherein said clutch valve (80) has a valve biasing means (260) such that a default position of the clutch valve (80) will have the clutch cylinder (10) exhausting to the surrounding environment.

3. The electro-pneumatic control system as per claim 1, wherein said launch control valve (60) has a launch control valve biasing means (300) such that in a default position the launch control valve (60) allows said pressure medium to flow to the clutch cylinder (10).

4. The electro-pneumatic control system as per claim 1, wherein said clutch lever (30) has a biasing means (240) such that said clutch cylinder (10) is returned to its home position when said pressure medium is exhausted.

5. The electro-pneumatic control system as per claim 1, wherein said restrictor (70) is adapted to be fixed or adjusted to control a flow of pressure medium through it thereby controlling a clutch rate of engagement.

6. The electro-pneumatic control system as per claim 1, wherein it further comprises a pneumatic gear cylinder (120) having a gear cylinder rod (130) connected to push-pull a gear lever (150) attached to a gear selection drum, valve means being provided to control said gear cylinder (120) by regulating a pressure medium flow from said pressure medium source (230).

7. The electro-pneumatic control system as per claim 6, wherein said gear cylinder (120) is a double acting pneumatic gear cylinder (120) and said valve means comprises an at least 4/3 way gear valve (190) controlled by an electrically operated gear valve switch (290) to allow said pressure medium to be introduced from said pressure medium source (230) selectively into either one or the other end of the gear cylinder (120).

8. The electro-pneumatic control system as per claim 7, wherein said gear valve (190) has a valve biasing means (270) such that a default position of said gear valve (190) will have said gear cylinder (120) exhausting to a surrounding environment.

9. The electro-pneumatic control system as per claim 6, wherein said lever (150) has a biasing means (250) such that said gear cylinder (120) is returned to its home position when said pressure medium is exhausted.

10. The electro-pneumatic control system as per claim 6, wherein said gear cylinder (120) is installed with said gear cylinder rod (130) half-extended, and is pivotably mounted on a gear cylinder mounting element (140) to freely pivot along an axis parallel to that defined by said gear lever (150), and said gear cylinder rod (130) is connected to said gear lever (150) by an intermediate connecting piece (160) to prevent bending moments on the assembly.

11. The electro-pneumatic control system as per claim 1 wherein said pressure medium is carbon dioxide ($CO_2$) gas, and said pressure medium source (230) is a $CO_2$ tank and regulator.

12. The electro-pneumatic control system as per claim 1 wherein said pressure medium is air, and said pressure medium source (230) is an air compressor and tank.

13. The electro-pneumatic control system as per claim 1, wherein a digital controller is used for reading in data from sensor inputs such as switches and position sensors, and writing data to actuators, and an analog circuit is used to support said digital controller.

14. The electro-pneumatic control system as per claim 13, wherein said actuators are solenoids.

15. The electro-pneumatic control system as per claim 13, wherein said actuators are relays.

16. The electro-pneumatic control system as per claim 1, wherein said clutch cylinder (10) is pivotably mounted on a clutch cylinder mounting element (90) to freely pivot along an axis parallel to that defined by said clutch lever (30), and said clutch cylinder rod (110) is connected to said clutch lever (30) by a link piece (20).

17. The electro-pneumatic control system as per claim 1, wherein said clutch cylinder (10) is fixedly mounted on a clutch cylinder mounting element (90), and said clutch cylinder rod (110) is connected to said clutch lever (30) by an intermediate connecting rod (340) to prevent bending moments on the assembly of said elements.

18. The electro-pneumatic control system as per claim 1, wherein said clutch valve (80) and said launch control valve (60) comprise an at least 3/2 way valve.

19. An electro-pneumatic control system for a motorcycle transmission, comprising a pneumatic clutch cylinder (10) used to disengage a clutch by pulling in a clutch lever (30) via a clutch cylinder rod (110), valve means being provided to control said clutch cylinder (10) by regulating a pressure medium flow from a pressure medium source (230), wherein said clutch cylinder (10) is a single acting pneumatic clutch cylinder (10) and said valve means comprise a clutch valve (80) controlled by an electrically operated clutch valve switch (280) to allow said pressure medium to be introduced from said pressure medium source (230) into one end of the clutch cylinder (10) and said clutch cylinder has a through rod (100) connected at one end to said clutch lever (30) and at another end to a manually operated clutch cable (50) via a slip device (40).

20. The electro-pneumatic control system as per claim 19, wherein an end piece (350) of said clutch cable (50) slides into said slip device (40) during a controlled clutching without applying any force to said clutch lever (30) and said end piece (350) of said clutch cable (50) pulls on said slip device (40) that pulls in turn on said through rod (100) and said clutch lever (30) during manual clutching to provide manual override.

21. The electro-pneumatic control system as per claim 19 wherein it further comprises a pneumatic gear cylinder (120) having a gear cylinder rod (130) connected to push-pull a gear lever (150) attached to a gear selection drum, valve means being provided to control said gear cylinder (120) by regulating a pressure medium flow from said pressure medium source (230).

22. The electro-pneumatic control system as per claim 21, wherein said gear cylinder (120) is a double acting pneumatic gear cylinder (120) and said valve means comprises an at least 4/3 way gear valve (190) controlled by an electrically operated gear valve switch (290) to allow said pressure medium to be introduced from said pressure medium source (230) selectively into either one or the other end of the gear cylinder (120).

23. The electro-pneumatic control system as per claim 22, wherein said gear valve (190) has a valve biasing means (270) such that a default position of said gear valve (190) will have said gear cylinder (120) exhausting to a surrounding environment.

24. The electro-pneumatic control system as per claim 21, wherein said lever (150) has a biasing means (250) such that said gear cylinder (120) is returned to its home position when said pressure medium is exhausted.

25. The electro-pneumatic control system as per claim 21, wherein said gear cylinder (120) is installed with said gear cylinder rod (130) half-extended, and is pivotably mounted on a gear cylinder mounting element (140) to freely pivot along an axis parallel to that defined by said gear lever (150), and said gear cylinder rod (130) is connected to said gear lever (150) by an intermediate connecting piece (160) to prevent bending moments on the assembly.

26. The electro-pneumatic control system as per claim 19, wherein said clutch valve (80) comprises an at least 3/2 way valve.

27. The electro-pneumatic control system as per claim 19, wherein said clutch valve (80) has a valve biasing means (260) such that a default position of the clutch valve (80) will have the clutch cylinder (10) exhausting to the surrounding environment.

28. The electro-pneumatic control system as per claim 19, wherein said clutch lever (30) has a biasing means (240) such that said clutch cylinder (10) is returned to its home position when said pressure medium is exhausted.

29. The electro-pneumatic control system as per claim 19 wherein said pressure medium is carbon dioxide ($CO_2$) gas, and said pressure medium source (230) is a $CO_2$ tank and regulator.

30. The electro-pneumatic control system as per claim 19 wherein said pressure medium is air, and said pressure medium source (230) is an air compressor and tank.

31. The electro-pneumatic control system as per claim 19, wherein a digital controller is used for reading in data from sensor inputs such as switches and position sensors, and writing data to actuators, and an analog circuit is used to support said digital controller.

32. The electro-pneumatic control system as per claim 31, wherein said actuators are solenoids.

33. The electro-pneumatic control system as per claim 31, wherein said actuators are relays.

34. The electro-pneumatic control system as per claim 19, wherein said clutch cylinder (10) is pivotably mounted on a clutch cylinder mounting element (90) to freely pivot along an axis parallel to that defined by said clutch lever (30), and said clutch cylinder rod (110) is connected to said clutch lever (30) by a link piece (20).

35. The electro-pneumatic control system as per claim 19, wherein said clutch cylinder (10) is fixedly mounted on a clutch cylinder mounting element (90), and said clutch cylinder rod (110) is connected to said clutch lever (30) by an intermediate connecting rod (340) to prevent bending moments on the assembly of said elements.

36. The electro-pneumatic control system as per claim 19, wherein said clutch cylinder (10) is connected to said clutch lever (30) by the clutch cylinder rod (110), and said clutch cylinder rod (110) is connected to said clutch lever (30) by a link piece (20).

37. The electro-pneumatic control system as per claim 19, wherein said clutch cylinder rod (110) is connected to said clutch lever (30) by an intermediate cable (370) able to convert movement of the clutch lever in one direction into movement of the clutch cylinder rod, to allow varied physical and angular placement of the clutch lever relative to the clutch cylinder rod.

* * * * *